United States Patent [19]

Räbel

[11] Patent Number: 5,439,169
[45] Date of Patent: Aug. 8, 1995

[54] TEMPERATURE REGULATING CONTROL DEVICE AND METHOD OF MAKING THE SAME

[75] Inventor: Peter Räbel, Lauf-Schönberg, Germany

[73] Assignee: Robertshaw Controls Company, Richmond, Va.

[21] Appl. No.: 180,895

[22] Filed: Jan. 12, 1994

[51] Int. Cl.$^6$ .............................................. G01K 5/00
[52] U.S. Cl. ......................................... 236/94; 116/221; 337/376; 374/198; 374/206
[58] Field of Search ............... 236/94, 68 B; 165/11.1; 116/216, 221; 337/376; 374/206, 198

[56] References Cited

U.S. PATENT DOCUMENTS 2,729,719  1/1956  Kronmiller .................. 337/376 X
3,251,549  5/1966  Hewitt, Jr. et al. ............... 236/94 X
5,183,204  2/1993  Kelly et al. ....................... 236/94

FOREIGN PATENT DOCUMENTS 812958   5/1959  Germany ...................... 337/376
7027190  12/1970  Germany .

Primary Examiner—William E. Wayner
Attorney, Agent, or Firm—Candor, Candor & Tassone

[57] ABSTRACT

A temperature regulating control device and method of making the same are provided, the device comprising a housing, a movable selector unit carried by the housing for selecting a temperature the control device is to tend to maintain, and an ambient temperature sensing means carried by the selector unit for indicating the ambient temperature being sensed by the temperature sensing means.

5 Claims, 2 Drawing Sheets

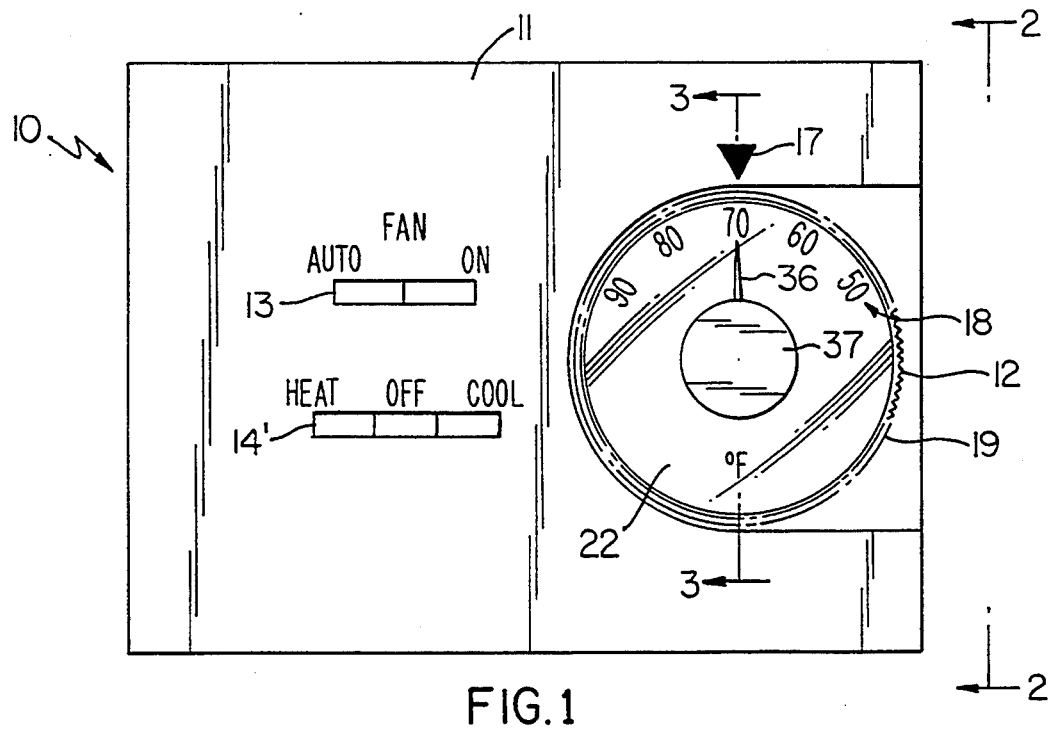
FIG. 1
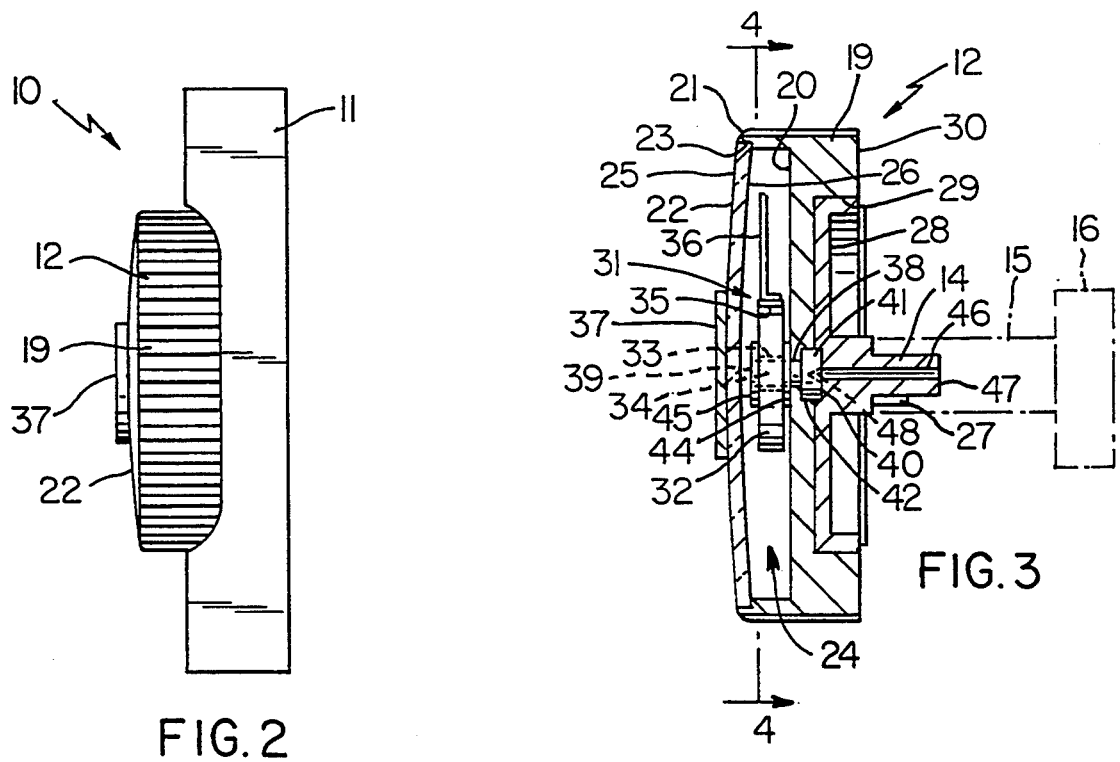
FIG. 2
FIG. 3

TEMPERATURE REGULATING CONTROL DEVICE AND METHOD OF MAKING THE SAME

BACKGROUND OF THE INVENTION

1. Field of the Invention

This invention relates to a new temperature regulating control device, such as a wall thermostat for controlling a heat exchanger means, and to a new method of making such a control device.

2. Prior Art Statement

It is known to provide a temperature regulating control device comprising a housing means and a movable selector means carried by the housing means for selecting a temperature the control device is to tend to maintain, the selector means comprising a rotatable knob. For example, see the German Patent No. 7027190 that was published Dec. 23, 1970.

SUMMARY OF THE INVENTION

It is one of the features of this invention to provide a new temperature regulating control device wherein the movable selector means thereof not only has means for permitting the user thereof to select the desired temperature that the control device is to tend to maintain, but also the selector means has means for indicating to the user the actual ambient temperature that exists at that time at the location adjacent the control device.

In particular, it has been found according to the teachings of this invention that the movable selector means itself can carry an ambient temperature sensing means for indicating the ambient temperature being sensed by that temperature sensing means.

For example, one embodiment of this invention comprises a temperature regulating control device comprising a housing means, a movable selector means carried by the housing means for selecting a temperature the control device is to tend to maintain, and an ambient temperature sensing means carried by the selector means for indicating the ambient temperature being sensed by the temperature sensing means.

Accordingly, it is an object of this invention to provide a new temperature regulating control device having one or more of the novel features of this invention as set forth above or hereinafter shown or described.

Another object of this invention is to provide a new method of making such a temperature regulating control device, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein.

BRIEF DESCRIPTION OF THE DRAWINGS

FIG. 1 is a front view of the new temperature regulating control device of this invention.

FIG. 2 is a side view of the control device of FIG. 1 and is taken in the direction of the arrows 2—2 of FIG. 1.

FIG. 3 is a cross-sectional view of just the movable selector means of the control device of FIGS. 1 and 2, FIG. 3 being taken in the direction of the arrows 3—3 of FIG. 1 and schematically illustrating how the selector means is operatively interconnected to the temperature regulating means of the control device.

DESCRIPTION OF THE PREFERRED EMBODIMENT

Figure 4:
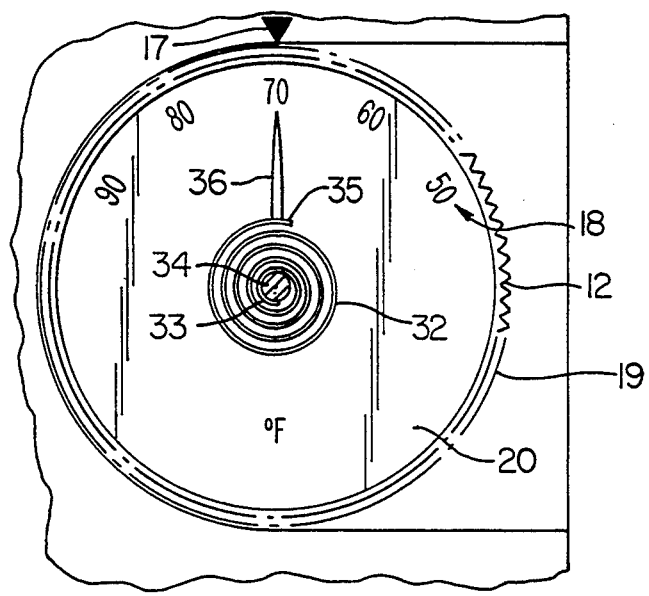
FIG. 4 is an enlarged cross-sectional view of the movable selector means of the control device illustrated in FIG. 3 and is taken in the direction of the arrows 4—4 of FIG. 3.
Figure 5:
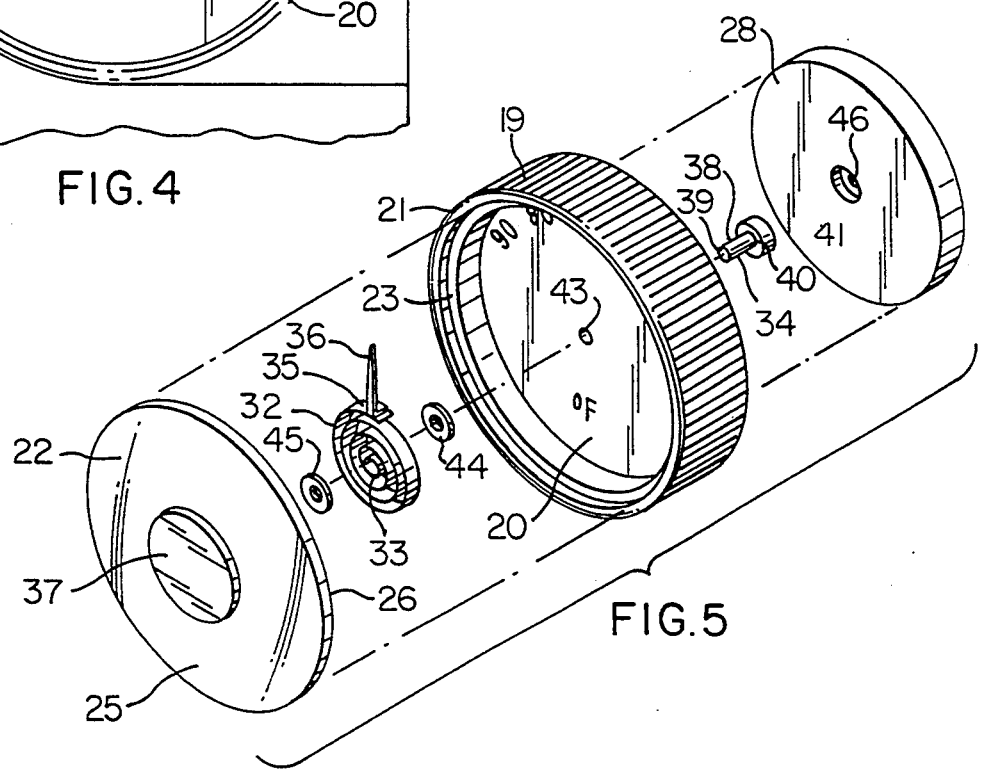
FIG. 5 is an exploded perspective view of the various parts of the selector means of FIG. 4.

While the various features of this invention are hereinafter illustrated and described as providing a movable selector means for a particular temperature regulating control device, it is to be understood that the various features of this invention can be utilized singly or in various combinations thereof to provide a movable selector means for other types of temperature regulating control devices as desired.

Therefore, this invention is not to be limited to only the embodiment illustrated in the drawings, because the drawings are merely utilized to illustrate one of the wide variety of uses of this invention.

Referring now to FIGS. 1 and 2, the new temperature regulating control device of this invention is generally indicated by the reference numeral 10 and comprises a substantially rectangular housing means 11 for being mounted to any desired structure, such as a wall, in a conventional manner as the temperature regulating unit 10 in the embodiment illustrated in the drawings comprises a room thermostat for controlling the output temperature effect of a heat exchanger means, such as a furnace and/or air conditioning apparatus, in relation to a desired temperature that has been set by an operator utilizing a movable selector means 12 of the control device 10 in a manner hereinafter described.

The control device 10 has other function selector means 13 and 14', such as for respectively controlling the blower or fan of the furnace and to select a cooling or heating operation of the heat exchanger means, whereby the temperature regulating control device 10 operates in a conventional manner for controlling the output temperature effect of a heat exchanger means in a manner well known in the art. For example, see the U.S. Pat. No. 3,948,441 to Perkins et al, and the U.S. Pat. No. 5,102,042 to Hart, whereby these two U.S. patents are being incorporated into this disclosure by this reference thereto.

Therefore, since the general operation of a wall thermostat for controlling the output temperature effect of a heat exchanger means is well known in the art, only the details of the temperature regulating control device 10 of this invention that are believed necessary to understand the features of this invention will be hereinafter described.

The movable selector means 12 of the control device 10 comprises a knob-like or disc-like structure that has a shaft means 14 for interconnecting with an operator 15 of a temperature regulating means 16, FIG. 3, to cause the temperature regulating means 16 to operate a heat exchanger means (not shown) in relation to the rotational position of the operator 15 and, thus, the rotatable position of the selector means 12 relative to an indicator 17 carried by the housing means 11 of the control device 10.

The indicator 17 of the housing means 11 can comprise a pointer or other indicator and is adapted to cooperate with a scale 18 carried by the selector knob 12 so that rotation of the selector knob 12 positions a desired temperature of the scale 18 that the control device 10 is to maintain adjacent the pointer 17 so that it can be seen in FIG. 1 that the temperature regulating control device 10 has been set to tend to maintain the output temperature effect of the heat exchanger means at approximately 70° F.

The control knob 12 comprises a structural member 19 formed of any suitable material, such as metallic material, plastic material, etc., and having a flat surface 20 surrounded by an annular peripheral flange 21 that receives a transparent circular plate 22 in an annular groove 23 thereof so that the transparent plate 22 cooperates with the annular flange 21 and the surface 20 of the member 19 to define a chamber 24 in the knob 12. The scale 18 is printed or otherwise disposed on either the flat surface 20 or on an outer surface 25 of the transparent disc 22 or on an inner surface 26 thereof, as desired, so that the scale 18 is fully visible from the front of the control device 10 as illustrated in FIG. 1, the scale 18 being calibrated in any suitable manner so as to correspond to the temperature setting positions of the operator 15 of the temperature regulator means 16 when the shaft 14 of the knob 12 is interconnected to the operator 15 in any suitable manner, such as by a spline means 27 of the shaft means 14.

The shaft 14 of the knob 12 is interconnected to a disc-like part 28 that is disposed in a recess 29 formed in the rear surface 30 of the structural member 19 as illustrated and can be secured therein in any suitable manner, such as by being press-fit therein, adhesively fastened therein, etc. Likewise, the transparent plate 22 can be secured in the groove 23 of the structural member 19 in any suitable manner and be formed of any suitable material.

An ambient temperature sensing means that is generally indicated by the reference numeral 31 is carried by the knob 12 and comprises a spiral wound bimetallic member 32 having an inner end 33 interconnected to a hub 34 and an outer end 35 carrying a pointer 36 that cooperates with the scale 18 to indicate the ambient temperature being sensed by the temperature sensing means 31 as the bimetallic member 32 is disposed in the chamber 24 of the knob 12 so that the pointer 36 is visible through the transparent disc 22 and operates or moves relative to the scale 18.

In order to effectively hide the bimetal member 32 from view, a suitable decorative disc member 37 is secured centrally on the front surface 25 of the transparent disc 22 whereby only the pointer 36 of the ambient temperature sensing means 31 can be viewed from the front of the control device 10.

The hub 34 of the ambient temperature sensing means 31 comprises a shaft-like portion 38 that has opposed ends 39 and 40, the end 40 having an enlarged head 41 thereon that is received in a recess 42 in the structural member 19 while the shaft portion 39 passes through an opening 43 formed through the structural member 19. A pair of washer-like members or bearing means 44 and 45 are respectively carried on the shaft portion 38 of the hub 34 on opposite sides of the bimetal member 32 to thereby not only hold the bimetal member 32 on the hub 34 but also to permit the bimetal member 32 to wind and unwind thereon during its temperature sensing function in a manner well known in the art.

The shaft 14 of the knob 12 has an opening 46 interrupting the end 47 thereof and leading to the head 41 of the hub 34 so as to permit a suitable tool, such as a Phillips screwdriver, to be inserted therein and engage against a cooperating notch 48 in the head 41 to permit the hub 34 to be rotated to the proper position thereof so that the pointer 36 will indicate the temperature on the scale 18 that the ambient temperature sensing means 31 is actually sensing at that adjustment time.

Therefore, since the hub 34 of the ambient temperature sensing means 31 will be held in its adjusted position by suitable friction means in a manner well known in the art, the ambient temperature sensing means 31 thereafter will always indicate the actual ambient temperature being sensed thereby and indicate such temperature by the pointer 36 pointing to that temperature on the scale 18.

After the ambient temperature sensing means 31 has been adjusted in the manner previously set forth, the knob or selector means 12 can then be assembled to the control device 10 by having the shaft 14 thereof coupled with the operating means 15 of the temperature sensing means 16 in the housing means 11 in a manner well known in the art so that the scale 18 will be properly positioned relative to the indicator 17 on the housing means 11 whereby the positioning of the particular temperature number on the scale 18 relative to the indicator 17 by rotation of the knob 12 will cause the temperature regulating means 16 to tend to maintain the output temperature effect of the heat exchanger means operatively interconnected to the control device 10 at that selected temperature in a manner well known in the art.

For example, should an operator set the control knob 12 by rotating the same to a selected temperature, such as 70° F., while the previous setting of the control knob 12 was 60° F. so that the pointer 36 of the ambient temperature means 31 was pointing to the "60" numeral on the scale 18, the number 70 on the knob 12 will now be positioned adjacent to the indicator 17 on the housing 11 of the control device 12 while the pointer 36 will be pointing to the number "60" on the scale 18 as the ambient temperature sensing means 31 is rotated in unison with the knob 12 to the new position thereof. However, as the ambient temperature being sensed by the ambient temperature sensing means 31 increases through the control device 10 operating the heat exchanger means to increase the output temperature effect thereof to the selected 70° F., the pointer 36 will eventually move to indicate the increasing ambient temperature on the scale 18 until the same is positioned at the "70°" position as illustrated in FIG. 1 as the output temperature effect of the heat exchanger means has now been adjusted by the control device 10 to produce an output temperature effect of approximately 70° F. as selected by the knob 12.

Therefore, it can be seen that the scale 18 of the control knob 12 is not only being utilized for selecting the temperature setting of the control device 10, but also the scale 18 is being utilized as an indication of the actual ambient temperature being sensed adjacent that control device 10 through the cooperation of the scale 18 with the pointer 36 for the reasons previously set forth.

If desired, suitable stops can be provided on the knob 12 that cooperate with suitable stops on the housing means 11 to limit the rotational movement of the knob 12 relative to the housing means 11 so that only predetermined minimum and maximum temperatures can be selected by the knob 12 for the control device 10 to tend to maintain in a manner well known in the art. For example, such stops can be provided in the manner set forth in the German Patent No. 8028507 whereby this German patent is being incorporated into this disclosure by this reference thereto.

Thus, it can be seen that this invention not only provides a new temperature regulating control device, but also this invention provides a new method of making such a temperature regulating control device.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a temperature regulating control device comprising a housing means, a rotatable knob carried by said housing means for selecting a temperature said control device is to tend to maintain, and an ambient temperature sensing means carried by said knob for indicating the ambient temperature being sensed by said temperature sensing means, said knob having an axis of rotation and having a chamber therein, said temperature sensing means being carried in said chamber of said knob, said temperature sensing means comprising a spiraled bimetallic means, said temperature sensing means having a hub, said spiraled bimetallic means having outer end means and inner end means, said inner end means being carried by said hub and said outer end means comprising an indicator means, said knob having a side thereof that faces said housing means, the improvement wherein said side of said knob has opening means therethrough that is coaxial with said axis of rotation and that leads to said hub so as to permit rotatable adjustment of said hub relative to said knob by the insertion of a suitable tool into said opening means to engage said hub therewith.

2. A control device as set forth in claim 1 wherein one of said housing means and said knob has a fixed temperature scale carried thereby and the other of said housing means and said knob has an indicator carried thereby whereby the positioning of said knob locates said indicator relative to said scale to indicate the temperature selected thereby.

3. A control device as set forth in claim 2 wherein said temperature sensing means has said indicator means thereof positioned by said temperature sensing means relative to said scale to indicate the ambient temperature being sensed by said temperature sensing means at that particular time.

4. A control device as set forth in claim 2 wherein said knob has an outer peripheral edge means that is substantially circular, said scale being carried by said knob and being located adjacent said peripherial edge means and also being substantially circular.

5. A control device as set forth in claim 1 wherein said side of said knob comprises two parts secured together, said hub having a part thereof rotatably sandwiched between said two parts of said knob to rotatably mount said hub to said knob.

* * * * *